United States Patent [19]

Weber et al.

[11] 3,969,275

[45] July 13, 1976

[54] METHOD FOR IMPREGNATING A WATER-SENSITIVE SOLID WITH A WATER-SOLUBLE MATERIAL USING AN AQUEOUS IMPREGNATING SOLUTION

[75] Inventors: Heinz P. Weber, Berkeley; Gordon E. Langlois, Lafayette, both of Calif.

[73] Assignee: Chevron Research Company, San Francisco, Calif.

[22] Filed: Sept. 6, 1974

[21] Appl. No.: 503,983

[52] U.S. Cl............................ 252/455 R; 252/461; 252/463; 252/465; 252/475
[51] Int. Cl.².................. B01J 29/06; B01J 21/00; B01J 23/08
[58] Field of Search................ 252/455 R, 465, 463, 252/461, 475

[56] References Cited
UNITED STATES PATENTS

| | | | |
|---|---|---|---|
| 2,270,165 | 1/1942 | Groll et al. | 252/465 |
| 2,746,936 | 5/1956 | Plank | 252/455 R |
| 2,782,144 | 2/1957 | Pardee | 252/455 R |
| 2,945,909 | 7/1960 | Stine et al. | 252/455 R |

*Primary Examiner*—Carl F. Dees
*Attorney, Agent, or Firm*—G. F. Magdeburger; R. H. Davies; D. L. Hagmann

[57] ABSTRACT

A method is provided for impregnating a water-sensitive solid containing micropores, being substantially free of pores having a diameter above 1000 A., and comprising at least one metal oxide with a water-soluble material, said micropores containing a substantially water-insoluble gas, which comprises:

1. replacing the water-insoluble gas in said micropores with a hydrophylic gas selected from the group consisting of steam, substantially water-soluble gases, and mixtures thereof by stripping said solid with said hydrophylic gas; and
2. impregnating said solid by immersing the stripped solid in an agueous solution of said material.

11 Claims, No Drawings

METHOD FOR IMPREGNATING A WATER-SENSITIVE SOLID WITH A WATER-SOLUBLE MATERIAL USING AN AQUEOUS IMPREGNATING SOLUTION

BACKGROUND OF THE INVENTION

The present invention relates to a method for impregnating a solid with a water-soluble material. More particularly, it relates to a method for producing an alumina catalyst composite by impregnating a water-sensitive alumina suitable for use as a catalyst component with at least one additional catalyst component.

It is well known in the art to employ porous solids comprising at least one metal oxide as a component or support for materials, such as catalytic agents, promoters, adsorbents, and the like. The material is disposed upon the surfaces, interior and exterior of the carrier by any suitable means. A convenient and frequently used methods is impregnation by immersion using an aqueous solution of the desired material. However, it has been found that for certain metal oxide solids the ordinary aqueous immersion method is unsatisfactory. Surprisingly, a substantial fraction of these particular solids are found to shatter upon being immersed in water. This shattering represents an appreciable loss and added cost. The solids subject to this condition, i.e., sensitivity to water, in general are highly microporous materials which are substantially free of pores having diameters of the order of 1000 A. and larger, particularly a substantially alumina solid.

SUMMARY OF THE INVENTION

According to the present invention, a method is provided for impregnating a water-sensitive solid containing micropores and comprising at least one refractory solid metal oxide with a water-soluble material, the aforementioned micropores containing a substantially water-insoluble gas. In the method, the water-insoluble gas in the micropores is replaced with a hydrophylic gas selected from the gas consisting of steam, substantially water-soluble gases, and mixtures thereof by stripping the solid with the hydrophilic gas. The stripped solid is then immersed in an aqueous solution of the desired material.

In a particular embodiment of the invention, the material, a catalytic agent and/or a precursor thereof suitable for use in the hydrotreating of a hydrocarbon feed, such as an agent comprising at least one metal or metal compound of Groups VI-A and VIII of the Periodic Chart of the Atoms, preferably of the subgroup molybdenum, tungsten, cobalt and nickel, is disposed upon a water-sensitive oxide support. Preferably the oxide is alumina. The resulting composites are especially useful as hydrodesulfurization catalysts for treating sulfur-containing hydrocarbon feeds.

By the term "water-sensitive" as used herein and having reference to a microporous particulate solid substantially free or macropores is meant that upon immersion of particles of the solid in water at 71.6°F. (22°C.) for each 100 particles suitable for use as a catalyst component at least about 5 of the particles shatter into two or more fragments. An especially water-sensitive solid, and thus a kind of solid for which the present method is particularly useful, is by definition one that for each 100 of the particles at least 10 shatter under the conditions of the described test. Suitable particles, in general, have an average diameter in the range from about 0.5 to 5 mm.

By the term "substantially free of macropores" (i.e., pores having a pore diameter above about 1000 A.) as used herein iss meant that less than about 3 volume percent of the pore volume of the carrier is contributed by macropores.

The reason why a solid comprising at least one metal oxide substantially free of macropores should shatter upon immersion in water is not clearly evident. However, it appears that the cause, in large part, is related to a combination of factors, including the absence of macropores, the presence of a relatively water-insoluble gas in the micropores, and capillary forces of attraction. Apparently, when a microporous solid is immersed in water in the usual fashion, water is imbibed by the pores and associated channels in the carrier, and is drawn down into these capillary channels and pores. A substantially water-insoluble gas, for example air, nitrogen, oxygen and the like, present in the pores and channels cannot seasonably escape from the micropores and is compressed and heated with a pressure build-up to the bursting pressure of the solid. At this point, a substantial fraction of the carrier-sized particles shatter. In direct contrast, where the solid contains a substantial macropore content, there is usually little or no problem from shattering. Presumably the macropores serve as a chimney for venting of the water-insoluble gas. In further contrast, as in the present method, when the pores contain a hydrophylic gas, that is one which has a substantial solubility in water, relatively little or no shattering results when the carrier is immersed in water or an aqueous solution.

By "a substantially water-soluble hydrophylic gas," as used herein, is meant a gas which at the condition of temperature and pressure of immersion in the aqueous impregnating solution has a solubility in the impregnating solution of at least about 1 volume of the gas per volume of impregnating solution. Conversely, "a substantially water-insoluble gas," as used herein, is meant a gas which under the above conditions has a solubility in the aqueous impregnating solution which is appreciably less than 1 volume per volume of impregnating solution, for example less than about 0.6 volume per volume of impregnating solution.

EMBODIMENT

In a preferred embodiment, a charge of water-sensitive alumina solid sized for use as a catalyst component for a hydrodesulfurization catalyst for use in treating a sulfur-containing hydrocarbon is introduced into a holding zone of a stripping chamber fitted with a first port for introducing a hydrophylic gas at a first basal point of the chamber, a second port for venting the chamber at an upper point of the chamber, and a third port for introducing an aqeous impregnating solution at a second basal point of the chamber. The holding zone is located intermediate to said upper point and the higher of the basal points, and is bottomed by a screen sized to prevent downward passage of solid particles and to permit flow of gas or liquid through the screen, for example a 28 mesh screen. Via the first port a stripping stream of steam at about 220°F. or higher is introduced into the chamber, passed through the solid charge and vented from the chamber via the vent port. The introduction of steam is continued until the effluent gas from the chamber contains little or no air, for example a period of about 3 minutes. At this point in time, the air in the chamber and in the pores of the carrier has for practical purposes been fully stripped therefrom. In any event, the presence or absence of air or the like in the effluent gas stream may be readily determined by ordinary methods, including chromatographic determinations, sample collection and analysis, and the like. Next, while maintaining a steam flow into the chamber at least sufficient to prevent back-flow of air into the chamber, an aqueous solution which is about 0.24 molar in cobalt and 0.06 molar in phosphomolybdate is introduced into the chamber via the second basal port and in a quantity at least sufficient to completely immerse the solid charge. The immersion being completed, the flow of steam into the chamber is then discontinued. When the solid charge is fully saturated (little or no additional imbibition of liquid by the carrier) with the impregnation solution, the remaining solution is withdrawn from the chamber. The resulting impregnated-solid charge contains few or no shattered solid particles.

SOLID OXIDES

Solid, water-sensitive materials comprising at least one metal oxide containing micropores and substantially free of macropores are contemplated for use in the present method. In general these solids are essentially insoluble in water at 25°C. and 1 atmosphere pressure and have a pore volume of at least about 0.3 cc/gram. Preferably they comprise at least one metal oxide of the metals of Groups II, III and IV of the Periodic Chart of the Atoms. These oxides are often referred to as inorganic refractory metal oxides suitable for use as components of hydrocarbon conversion catalysts. Preferably the solid is predominantly alumina, that is, alumina which has an alumina content, based upon the solid, of at least about 80 weight percent and a macropore content which in the aggregate contributes less than about 3% of the pore volume of the solid. With decreasing macropore content and increasing pore volume, particularly for pore volumes in the range above about 0.5 cc/g, the problem of particle-shattering becomes increasingly acute. This is especially the case of an alumina solid which consists essentially of alumina, for example is at least 90 weight percent alumina, the balance being one or more of the other inorganic refractory oxides. This problem is also acute where the solid includes, in addition to alumina, a minor (less than 5 weight percent) amount of a diluent, for example another refractory metal oxide such as magnesia, silica, boria, titania, and the like, provided that the mixed-oxide carrier composite is substantially free of macropores. It may be more acute in the case of some diluents than for others, but in any case the present method is in general effective in reducing the shattering of water-sensitive solids comprising at least one metal oxide of the aforementioned group and substantially free of macropores.

STRIPPING AGENTS

Steam and substantially water-soluble gases in general are satisfactory for use in stripping a substantially water-insoluble gas (usually air, nitrogen, oxygen, or the like) from the pores of the porous solid oxide, and these gases are contemplated for use herein. Representative gases include steam, ammonia, hydrogen chloride, methanol, ethanol, i-propanol and the like vapors, methyl and ethylamine and the like vapors; that is, includes gases composed of organic compounds whose vapors are substantially water soluble, and mixtures of the foregoing. For many reasons, including its low acidity and cost, steam is much preferred for use in the present method.

STRIPPING CONDITIONS

For the stripping of a water-insoluble gas from a microporous solid oxide, a stream of a suitable hydrophylic gas is passed through a bed or mass of the solid in particulate form in a displacement zone. Suitable conditions primarily include a temperature at least sufficient to maintain the hydrophylic gas in the vapor state and continuation of the passge of the displacing gas for a time sufficient to insure more-or-less complete displacement of the water-insoluble gas from the micropores. In general, the mixing of the two gases in the void volume of the bed and in the micropores is rapid and hence a sufficient displacement is achieved, depending upon the particular combination of gases involved, after the passage through the bed of from 3 to 10 volumes of the displacing gas or until there is little or none of the water-insoluble gas in effluent stream from the displacement zone.

IMPREGNATING MATERIAL

A wide variety of materials is known and used as components of a composite comprising the material disposed upon a suitable metal oxide substrate. Included among these materials are water-soluble inorganic salts, acids, organic compounds, mixtures of the foregoing, and the like. The present method is, in general, satisfactory for use in disposing such materials upon a water-sensitive solid metal oxide, particularly upon an oxide comprising alumina, and such use is contemplated herein. Preferably the material is a catalytic agent or precursor thereof or a mixture of agent and agent-precursor materials for use in the processing of a hydrocarbon feedstock, of which representative processes include hydrotreating in general, including hydrocracking, hydrodesulfurizing, hydrodenitrification, hydroisomerizing and hydrodemetallizing. Representative materials include water-soluble salts and acids and mixtures thereof, and the like, containing at least one metal selected from metals of Groups IV, V, VI, VII and VIII of the elements. Preferably the present method is employed to prepare a catalyst composite consisting essentially of a microporous alumina carrier substantially free of macropores and having disposed thereon at least one hdyrogenating component and/or precursor thereof selected from metals of Groups VI-A and VIII of the Periodic Chart of the Atoms, especially of the subgroup consisting of molybdenum, cobalt and nickel.

IMPREGNATING CONDITIONS

A wide variety of impregnating conditions which, except for the present stripping and immersion sequences, are known and conventionally used in the art, are satisfactory and contemplated for use. In general, the immersion is effected at a temperature and pressure sufficiently low and high, respectively, to maintain the aqueous impregnating solution in the liquid phase. As a practical matter, a temperature below 80°C. and atmospheric pressure are preferred conditions. The aqueous solution may be contacted with the stripped solid in any convenient manner and with a satisfactory result, provided that the substantial absence of the water-insoluble gas, air or the like, from the micropores of the solid oxide is maintained until the immersion of the solid in the solution is complete. Preferably, the aqueous impregnating solution is introduced into contact with a mass of the oxide solid at one or more points below the surface of the solid.

The following examples are given for the purpose of further illustrating the present method. The examples are not intended to limit the scope of the present invention.

EXAMPLES

Examples I–IX

In the following comparative examples, portions of 3 different alumina ($Al_2O_3$) catalyst bases characterized as follows:

| Base | A | B | C |
|---|---|---|---|
| Particle diameter, mm | 1.6 | 1.6 | 0.91 |
| Pore volume, cc/g | 0.605 | 0.806 | 0.736 |
| Macropore content,* % of pore volume | 0.2 | 2.6 | 0.6 | were used for the preparation of a hydrocarbon hydrodesulfurization catalyst. In each case, the portion was freshly calcined under conventional and comparable conditions. All transferrals, stirring and movements of the portions, whether treated or otherwise, were made under comparable conditions calculated to cause minimal breakage and with no appreciable resulting breakage of the alumina particles. Each portion was comparably impregnated by immersion of the portion in separate aliquots of a conventional impregnating solution containing molybdenum, cobalt and phosphorus. The mixtures of immersed solid and impregnating solution were allowed to stand for 30 minutes with a brief, gentle stirring of the mix being carried out at 7.5-minute intervals. At the completion of the standing period, each impregnated portion was dried and calcined under a common set of conventional conditions.

In those cases where the portion of the calcined base was first treated by the present method, the portion was placed in a stripping zone and steam at about 220°F. and ambient pressure was passed through the portion for a period of 3 minutes, after which for all practical purposes the air in the micropores and in the void volume of the bed had been fully replaced by steam. While still under an atmosphere of steam, the stripped portion was immersed in the impregnating solution. Subsequent processing — immersing, drying and calcining — was then in accordance with the description above.

In the examples, the content of fines, the average particle length, the packed bulk density and the pressure drop for flowing gas through a bed of the catalyst particles are direct functions of the shattering experienced under the described impregnation conditions. Examples III, VI and IX provide a base line for the comparisons. The advantages of the present method are illustrated in the data in the following Tables.

TABLE I

| | Example No. | | |
|---|---|---|---|
| | I | II | III |
| Base | A | A | A |
| Impregnated | yes | yes | no |
| Treatment before impregnation | none | stripping | — |
| Fines, <16 mesh, wt.% | 0.42 | 0.14 | — |
| Avg. particle length, in. | 0.077 | 0.211 | 0.288 |
| Pressure drop, psi/ft | 0.45 | 0.14 | 0.15 |
| Packed bulk density, g/cc | 0.94 | 0.78 | 0.56 |

TABLE I-continued

Pressure drop was measured with 1.5 ft/sec air (superficial), at atmospheric conditions, flowing through a slowly poured catalyst bed, without vibrating, of bulk density shown

TABLE II

| | Example No. | | |
|---|---|---|---|
| | IV | V | VI |
| Base | B | B | B |
| Impregnated | yes | yes | no |
| Treatment before impregnation | none | stripping | — |
| Fines, <16 mesh, wt.% | 1.11 | 0.67 | — |
| Avg. particle length, in. | 0.148 | 0.159 | 0.182 |
| Pressure drop, psi/ft | 0.940 | 0.772 | 0.675 |
| Packed bulk density, g/cc | 0.822 | 0.810 | 0.570 |

Pressure drop was measured with 2.54 ft/sec air (superficial) at atmospheric conditions, flowing through a packed bed of bulk density shown

TABLE III

| | Example No. | | |
|---|---|---|---|
| | VII | VIII | IX |
| Base | C | C | C |
| Impregnated | yes | yes | no |
| Treatment before impregnation | none | stripping | — |
| Fines, <24 mesh, wt.% | 4.05 | 2.1 | 1.4 |
| Fines, <35 mesh, wt.% | 1.02 | 0.35 | 0.75 |
| Pressure drop, psi/ft | 1.10 | 0.86 | 0.85 |
| Packed bulk density, g/cc | 0.88 | 0.86 | 0.61 |

Pressure drop was measured with 1.69 ft/sec air (superficial), at atmospheric conditions flowing through a packed bed of bulk density shown The shattering of a base for a treated vs. an untreated base is evidenced by: (a) an increase in fines; (b) a shorter average particle length; (c) a greater bulk density; and (d) an increase in resistance to gas flow (pressure drop) through a bed. Examples I–III establish that the stripping of a water-insoluble gas, for example air, from the pores of a water-sensitive microporous solid metal oxide and replacement of this gas by a water-soluble gas, for example steam, as in the present method, results in a remarkable reduction in base particle shattering during impregnation of the base using an aqueous impregnation solution.

Base B relative to Base A, had a lower water sensitivity. Nevertheless, from a comparison of Examples IV–VI, it is readily apparent that the present invention is a substantial improvement over the ordinary method of impregnation, Example IV.

Base C relative to Bases A and B had a particle diameter which was roughly 0.6 of that for Bases A and B. In this case, too — compare Examples VII to IX — the present invention provides a substantial advantage over the ordinary method, Example VII.

The foregoing examples illustrate that water-sensitive materials comprising at least one metal oxide as herein described can be advantageously impregnated with a suitable water-soluble material by the method of the present invention.

What is claimed is:

1. A method for impregnating a water-sensitive solid with a water-soluble material, said solid containing micropores and comprising at least one metal oxide selected from the group consisting of oxides of metals of Groups II, III and IV of the Periodic Chart of the Atoms, and said micropores containing a substantially water-insoluble gas, which comprises:
1. replacing the water-insoluble gas in said micropores with a hydrophylic gas selected from the group consisting of steam, substantially water-soluble gases and mixtures thereof by stripping said solid with said hydrophylic gas under gas-stripping conditions; and
2. impregnating said solid by immersing the stripped solid in an aqueous solution of said material, said impregnating being effected while maintaining substantial absence of water-insoluble gas from the micropores of said solid.

2. A method as in claim 1 wherein said water-soluble gas is steam.

3. A method as in claim 1 wherein said oxide is alumina.

4. A method as in claim 1 wherein said water-insoluble gas is air and said water-soluble gas is steam.

5. A method as in claim 1 wherein said oxide consists essentially of alumina and contains at least one oxide of the group consisting of magnesia, silica, boria and titania.

6. A method as in claim 1 wherein said water sensitivity results in the shattering of at least 10 particles per 100 particles of said oxide.

7. A method as in claim 1 wherein said water-soluble material is selected from the group consisting of catalytic agents, precursors of catalytic agents and mixtures thereof suitable for use in the catalytic processing of a hydrocarbon feedstock.

8. A method as in claim 1 wherein said oxide consists essentially of alumina, said material is selected from the group consisting of hydrogenating components, precursors of hydrogenating components and mixtures thereof selected from the group consisting of compounds of metals of Groups VI-A and VIII of the Periodic Chart of the Atoms, and wherein the resulting impregnated alumina is suitable for use in the processing of a hydrocarbon feedstock.

9. A method as in claim 8 wherein said metals are at least one metal selected from the group consisting of molybdenum, cobalt and nickel.

10. A method for impregnating a water-sensitive solid with a water-soluble material comprising cobalt phosphomolybdate, said solid consisting essentially of particulate alumina containing micropores, said micropores containing a substantially water-insoluble gas, which comprises:
1. replacing the water-insoluble gas in said micropores with steam under gas-stripping conditions; and
2. impregnating said steam-stripped alumina by immersing it in an aqueous solution of said material, said impregnating being effected while maintaining substantial absence of water-insoluble gas from the micropores of said solid.

11. A method for impregnating a water-sensitive alumina solid sized for use as a catalyst component for a hydrodesulfurizing catalyst, said solid having micropores containing a substantially water-insoluble gas, which comprises the steps (1) introducing said solid into a holding zone of a stripping chamber, (2) stripping said water-insoluble gas from said solid by passing stripping steam through said solid and venting the resulting effluent gas stream from said chamber, said passing of steam being continued until said effluent steam contains little or no air, and (3) while maintaining said passing of steam into said zone and chamber at a flow at least sufficient to prevent back-flow of air into said chamber, basally introducing into said zone an aqueous solution of cobalt phosphomolybdate, said introduction being in an amount at least sufficient to completely immerse said solid.

* * * * *

UNITED STATES PATENT AND TRADEMARK OFFICE
CERTIFICATE OF CORRECTION

PATENT NO. : 3,969,275
DATED : July 13, 1976
INVENTOR(S) : Heinz P. Weber et al.

It is certified that error appears in the above-identified patent and that said Letters Patent are hereby corrected as shown below:

Preamble page, 2nd column, last line, "agueous" should read --aqueous--.

Col. 1, line 15, "or" should read --of--.

Col. 2, line 5, "iss" should read --is--.

Col. 5, line 22, eliminated; should read --*Pores having diameter above 1000 Angstroms Col. 8, line 31, "steam" should read --stream--.

Signed and Sealed this

Twelfth Day of October 1976

[SEAL]

Attest:

RUTH C. MASON
*Attesting Officer*

C. MARSHALL DANN
*Commissioner of Patents and Trademarks*